US012274292B2

(12) United States Patent
Liu

(10) Patent No.: US 12,274,292 B2
(45) Date of Patent: Apr. 15, 2025

(54) HOOKAH MODULE AND HOOKAH COMPRISING THE SAME

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 545 days.

(21) Appl. No.: 17/689,901

(22) Filed: Mar. 8, 2022

(65) Prior Publication Data

US 2022/0312834 A1 Oct. 6, 2022

(30) Foreign Application Priority Data

Apr. 2, 2021 (CN) ......................... 202120682694.7
Sep. 6, 2021 (CN) ......................... 202111039297.9
Sep. 6, 2021 (CN) ......................... 202122147819.9

(51) Int. Cl.
*A24F 1/30* (2006.01)
*A24F 5/00* (2006.01)
*A24F 7/00* (2006.01)
*H05B 6/10* (2006.01)

(52) U.S. Cl.
CPC .................. *A24F 1/30* (2013.01); *A24F 5/00* (2013.01); *A24F 7/00* (2013.01); *H05B 6/105* (2013.01)

(58) Field of Classification Search
CPC ......................................................... A24F 1/30
See application file for complete search history.

(56) References Cited

U.S. PATENT DOCUMENTS 4,111,214 A * 9/1978 Flesher ..................... A24F 1/30 131/198.1
2011/0079231 A1* 4/2011 Borushek .................. A24F 1/30 131/229
2018/0317544 A1* 11/2018 Hagen ....................... A24F 1/30

FOREIGN PATENT DOCUMENTS

WO WO-2016040530 A1 * 3/2016 ............... A24F 1/30

* cited by examiner

*Primary Examiner* — Michael H. Wilson
*Assistant Examiner* — Michael T Fulton
(74) *Attorney, Agent, or Firm* — MATTHIAS SCHOLL P.C.; Matthias Scholl

(57) ABSTRACT

A hookah module includes a water jar configured to filter harmful substances from smoke. The water jar includes a jar body including a water chamber configured to hold water; and the jar body includes a bottom part and a first detachable connector disposed on the bottom part.

4 Claims, 9 Drawing Sheets

HOOKAH MODULE AND HOOKAH COMPRISING THE SAME

CROSS-REFERENCE TO RELATED APPLICATIONS

Pursuant to 35 U.S.C. § 119 and the Paris Convention Treaty, this application claims foreign priority to Chinese Patent Application No. 202120682694.7 filed Apr. 2, 2021, to Chinese Patent Application No. 202111039297.9 filed Sep. 6, 2021, and to Chinese Patent Application No. 202122147819.9 filed Sep. 6, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a hookah module and a hookah comprising the same.

Conventional hookahs include water jars formed integrally under heaters. As smoke from burning tobacco materials flows into the water jars for filtering, the water temperature increases, causing the hookahs to overheat. It is uncomfortable for smokers to hold the hot hookahs in their hands. The smoke flows into the water jars with a small amount of smoke remained in the heaters or channels. When the smokers smoke the hookahs again, the residual smoke is inhaled into the mouth, affecting the taste of the tobacco smoke. Some heaters include channels for air conduction. As smoke flows through the channels, an increase in temperature reduces the lifespan of the electronic components. Furthermore, it is inconvenient to carry and clean the integral formed hookahs.

SUMMARY

The first objective of the disclosure is to provide a hookah module; the hookah module comprises a water jar configured to filter harmful substances from smoke; the water jar comprises a jar body comprising a water chamber configured to hold water; the jar body comprises a bottom part and a first detachable connector disposed on the bottom part.

In a class of this embodiment, the first detachable connector comprises a convex portion and/or a first magnet structure disposed on the bottom part of the jar body.

In a class of this embodiment, the convex portion protrudes from the bottom part of the jar body; and the first magnet structure is disposed on the convex portion.

In a class of this embodiment, the water jar further comprises a side wall and a pipe disposed in the jar body; the pipe comprises a first end and a second end; the pipe is disposed into the water jar with the first end exposed outside the side wall and the second end close to the bottom part of the jar body; the hookah module further comprises a smoke collector comprising a smoke chamber; the first end of the pipe is connected to the smoke collector; the smoke collector comprises a side wall comprising at least one through hole; the pipe communicates with the smoke chamber through the at least one through hole.

In a class of this embodiment, the hookah module further comprises a first cup comprising a first cavity communicating with the smoke chamber.

In a class of this embodiment, the first cup comprises a first end and a second end; the first end is closed and the second end is open; the smoke collector further comprises a bottom opening communicating with the second end of the first cup.

In a class of this embodiment, the first cup is detachably connected to the smoke collector.

In a class of this embodiment, the first cup comprises a cup body comprising the first cavity; the cup body comprises a first end and a second end; the first end is closed and the second end is open; the second end of the cup body extends radially outward to form a first flange; and the first flange extends axially to form a first side wall in the shape of a truncated cone with a larger opening towards the cup body.

In a class of this embodiment, the smoke collector further comprises a second side wall in the shape of a truncated cone with a larger end connected to a lower end of the smoke collector; the first side wall is matched with the second side wall in size so that the second side wall is nested in the first side wall; and the lower edge of the second side wall abuts against the first flange.

In a class of this embodiment, the first cup further comprises a side wall comprising an inner surface provided with a metal layer.

In a class of this embodiment, the hookah module further comprises a second cup comprising a second cavity communicating with the smoke chamber; and the second cup comprises a side wall comprising an inner surface provided with a metal layer.

In a class of this embodiment, the second cup comprises a first end and a second end; the first end is closed and the second end is open; the second cavity communicates with the first cavity through the second end of the second cup; and the second cup is detachably connected to the first cup.

In a class of this embodiment, the jar body further comprises a top portion provided with a hose communicating with the water chamber; the hose comprises an open distal end away from the water chamber and configured for smoke emission; and the hose is inclined relative to the jar body.

In a class of this embodiment, the open distal end of the hose extends axially to form a bowl-shaped sleeve to support the mouth of a smoker; the bowl-shaped sleeve comprises a third side wall and a wide opening; and a diameter of the bowl-shaped sleeve decreases from the wide opening to the open distal end of the hose.

In a class of this embodiment, the second end of the pipe comprises at least one air outlet.

In a class of this embodiment, the water jar further comprises at least one protection pad disposed between the first end of the pipe and the jar body.

In a class of this embodiment, the smoke collector further comprises an open top; the hookah module further comprises an air intake disposed in the open top; the air intake comprises an intake body, a first tube, and a second tube; the intake body is disposed in the open top and abuts against the side wall of the smoke collector; the intake body comprises a channel and two openings communicating with the channel; the two openings are disposed on both ends of the intake body; the first tube and the second tube are disposed on both ends of the intake body, respectively, to communicate with the two openings.

The second objective of the disclosure is to provide a hookah comprising a heater; the heater comprises a coil configured to produce an electromagnetic field in a power-on state; the heater comprises a top part and a second detachable connector disposed on the top part.

In a class of this embodiment, the second detachable connector comprises a first concave portion and/or a second magnet structure disposed on the top part of the heater.

In a class of this embodiment, the second magnet structure is disposed in the first concave portion.

In a class of this embodiment, the heater comprises a curved wall functioning as a handle.

In a class of this embodiment, the top part of the heater is concave to form a second concave portion defined by a fourth side wall; and the coil is wrapped around the fourth side wall.

In a class of this embodiment, the hookah further comprises at least one elastic support disposed on the top part of the heater; and the second concave portion comprises an outlet and the at least one elastic support is disposed around the outlet.

In a class of this embodiment, the hookah further comprises a first cup disposed in the second concave portion; the first cup comprises a first cavity and a side wall; and the side wall of the first cup comprises an inner surface provided with a metal layer.

In a class of this embodiment, the first cup is disposed in the second concave portion; the hookah further comprises a second cup comprising a second cavity; the second cup is disposed in the first cavity so that the first cavity communicates with the second cavity; and the second cup comprises a side wall comprising an inner surface provide with a metal layer.

In a class of this embodiment, the first cup is detachably connected to the second concave portion; and the second cup is detachably connected to the first cup.

In a class of this embodiment, the first cup comprises a cup body comprising the first cavity; the cup body comprises a first end and a second end; the first end is closed and the second end is open; the second end of the cup body extends radially outward to form a first flange; and the first flange is disposed on the at least one elastic support.

In a class of this embodiment, the hookah further comprises a water jar detachably disposed on the top part of the heater; the water jar comprises a jar body provided with a water chamber configured to hold water; the jar body comprises a bottom part provided with a first detachable connector; and the first detachable connector is detachably connected to the second detachable connector.

In a class of this embodiment, the water jar further comprises a side wall and a pipe disposed in the jar body; the pipe comprises a first end and a second end; the pipe is disposed into the water jar with the first end exposed outside the side wall and the second end close to the bottom part of the jar body; the hookah further comprises a smoke collector comprising a water chamber; the first end of the pipe is connected to the smoke collector; the smoke collector comprises a side wall comprising at least one through hole; the pipe communicates with the smoke chamber through the at least one through hole; the first cup comprises a first end and a second end; the first end is closed and the second end is open; the smoke collector further comprises a bottom opening communicating with the second end of the first cup.

In a class of this embodiment, the first flange extends axially to form a first side wall in the shape of a truncated cone with a larger opening towards the cup body; the smoke collector further comprises a second side wall in the shape of a truncated cone with a larger end connected to a lower end of the smoke collector; the first side wall is matched with the second side wall in size so that the second side wall is nested in the first side wall; and the lower edge of the second side wall abuts against the first flange.

In a class of this embodiment, the jar body further comprises a top portion provide with a hose communicating with the water chamber; the hose comprises an open distal end away from the water chamber and configured for smoke emission; and the hose is inclined relative to the jar body.

In a class of this embodiment, the open distal end of the hose extends axially to form a bowl-shaped sleeve to support the mouth of a smoker; the bowl-shaped sleeve comprises a third side wall and a wide opening; and a diameter of the bowl-shaped sleeve decreases from the wide opening to the open distal end of the hose.

In a class of this embodiment, the second end of the pipe comprises at least one air outlet.

In a class of this embodiment, the water jar further comprises at least one protection pad disposed between the first end of the pipe and the jar body.

In a class of this embodiment, the smoke collector further comprises an open top; the hookah further comprises an air intake disposed in the open top; the air intake comprises an intake body, a first tube, and a second tube; the intake body is disposed in the open top and abuts against the side wall of the smoke collector; the intake body comprises a channel and two openings communicating with the channel; the two openings are disposed on both ends of the intake body; the first tube and the second tube are disposed on both ends of the intake body, respectively, to communicate with the two openings.

As used herein, the term "detachably connected" refers to joining of one component to another by means configured to allow for the separation of the components at the point of attachment. Examples of such detachable means include screw threads, interference fits, buckles, clamps, magnets, adhesives, and pluggable connectors.

The following advantages are associated with the hookah module and the hookah of the disclosure: the water jar is disposed on the heater so that the smoker can hold the hookah in the palm while smoking the tobacco materials. The smoke is directly forced into the water jar, which prevents smoke accumulation in the heater. The heater allows electronic components to operate at high temperatures without having to design a channel for air conduction. The smoke generated from the heater is first cooled in the pipe and then flows into the water jar for filtering and another cooling, thus improving the taste of the tobacco smoke. The water jar is detachably connected to the heater so that the hookah module can be assembled, disassembled, and cleaned in a quick and efficient manner.

Figure 1:
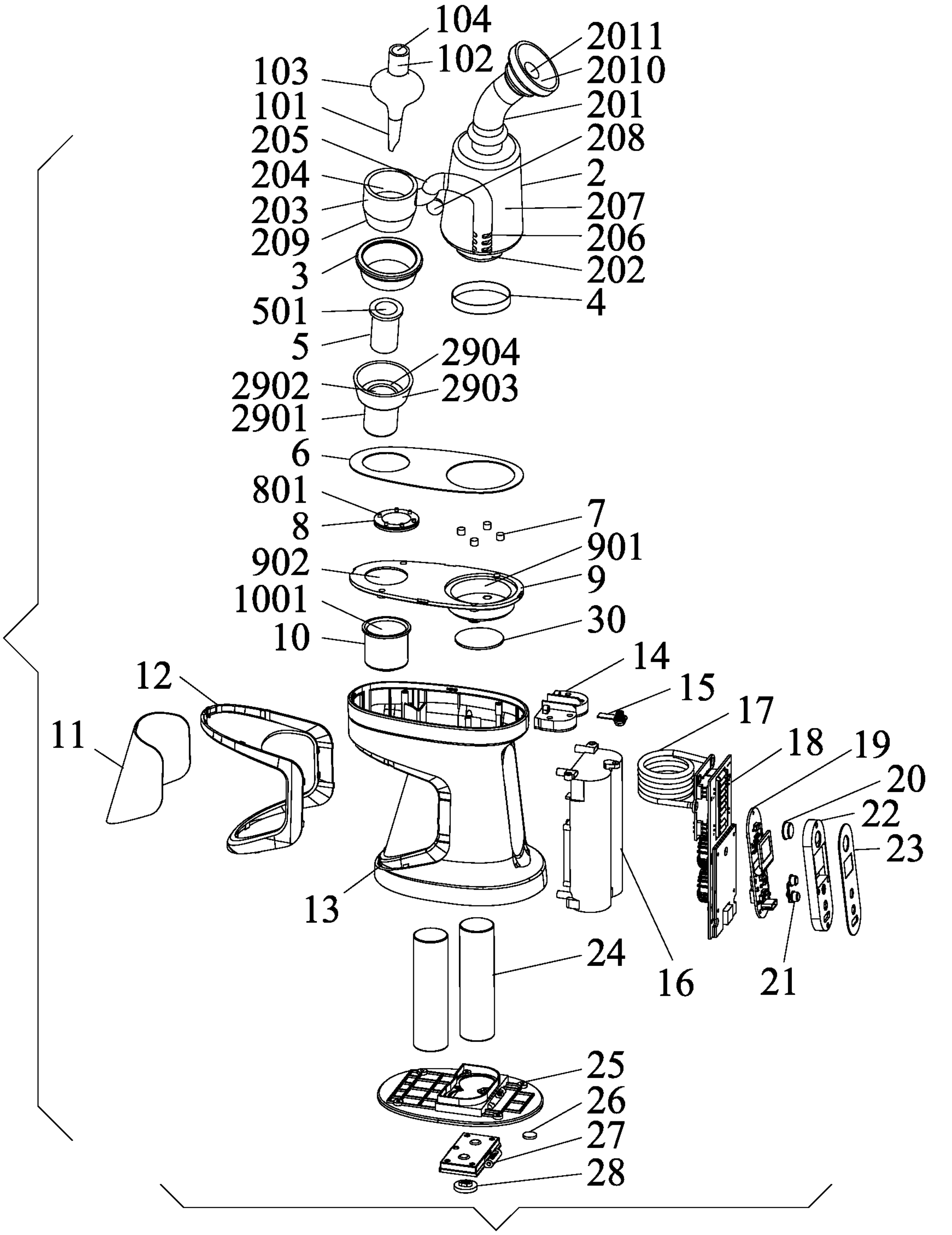
FIG. 1 is an exploded view of a hookah according to one embodiment of the disclosure.

In the drawings, the following reference numbers are used: 1. Air intake; 2. Water jar; 3. Thermal protective sleeve; 4. First magnet structure; 5. Second cup; 6. First cover; 7. Second magnet structure; 8. Thermal protective ring; 9. Second cover; 10. Thermal protective cup; 11. Holding part; 12. Bracket; 13. Housing; 14. Electrode bracket; 15. First electrode; 16. Battery bracket; 17. Coil; 18. High frequency power supply; 19. Charging board; 20. Power button; 21. Power adjustable button; 22. Charging board bracket; 23. Mirror; 24. Battery; 25. Third cover; 26. Rubber plug; 27. Second electrode; 28. Toggle switch; 29. First cup; 30. Protective plate; 90. Heater; 101. First tube; 102. Second tube; 103. Intake body; 104. Opening; 105. Channel; 200. Jar body; 201. Hose; 202. Convex portion; 203. Smoke collector; 205. Pipe; 206. Air outlet; 207. Water chamber; 209. Second side wall; 501. Second cavity; 801. Elastic support; 901. First concave portion; 902. Outlet; 1001. Second concave portion; 2010. Third side wall; 2011. Mouthpiece; 2012. Through hole; 2901. Cup body; 2902. First cavity; 2903. First side wall; and 2904. First flange.

DETAILED DESCRIPTION

To further illustrate the disclosure, embodiments detailing the hookah module and the hookah of the disclosure are described below. It should be noted that the following embodiments are intended to describe and not to limit the disclosure.

Figure 2:
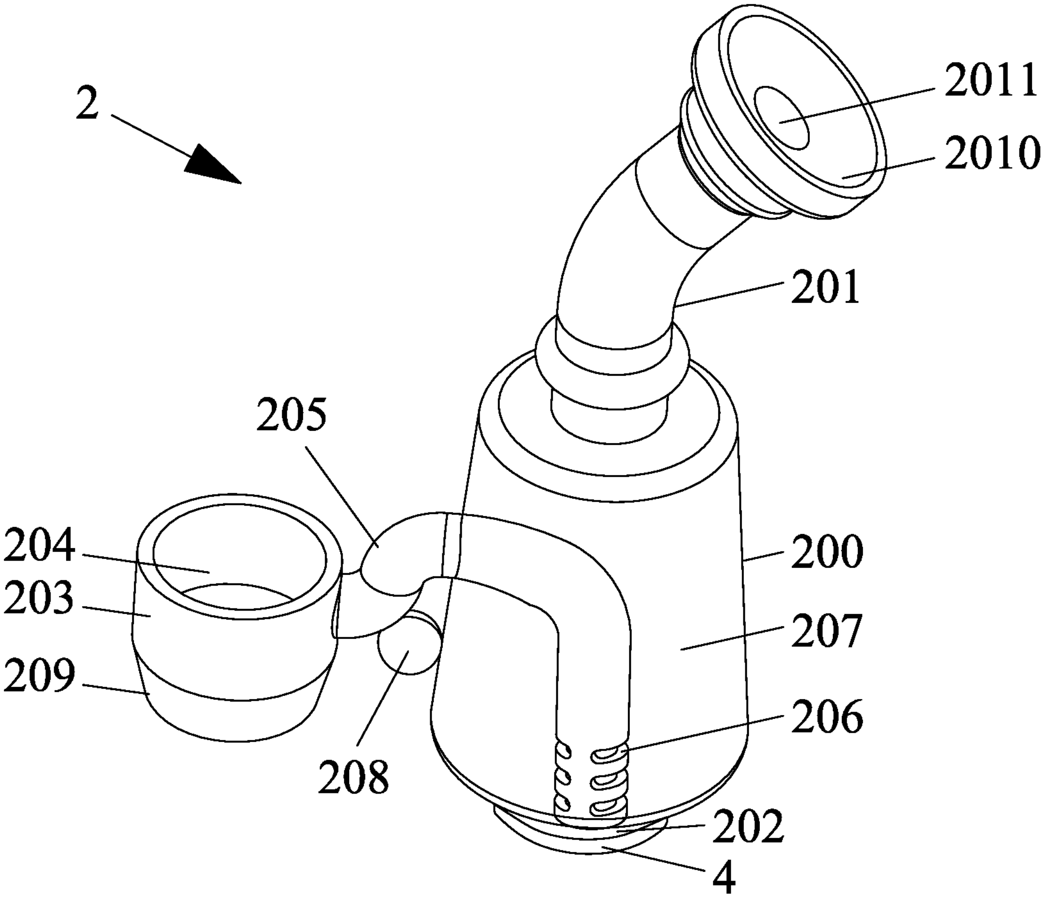
FIG. 2 is a perspective view of a water jar according to one embodiment of the disclosure.
Figure 3:
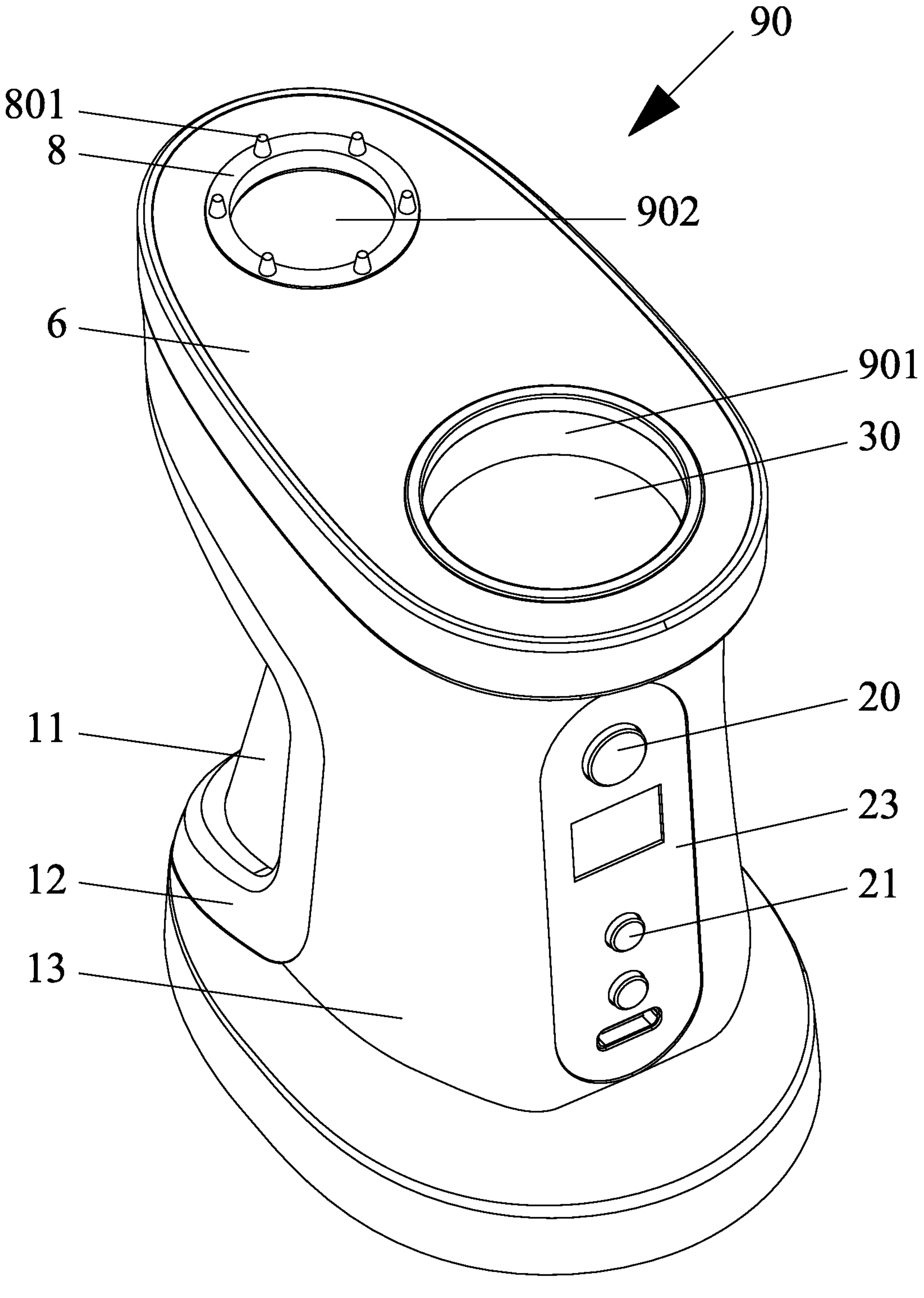
FIG. 3 is a perspective view of a heater according to one embodiment of the disclosure.
Figure 4:
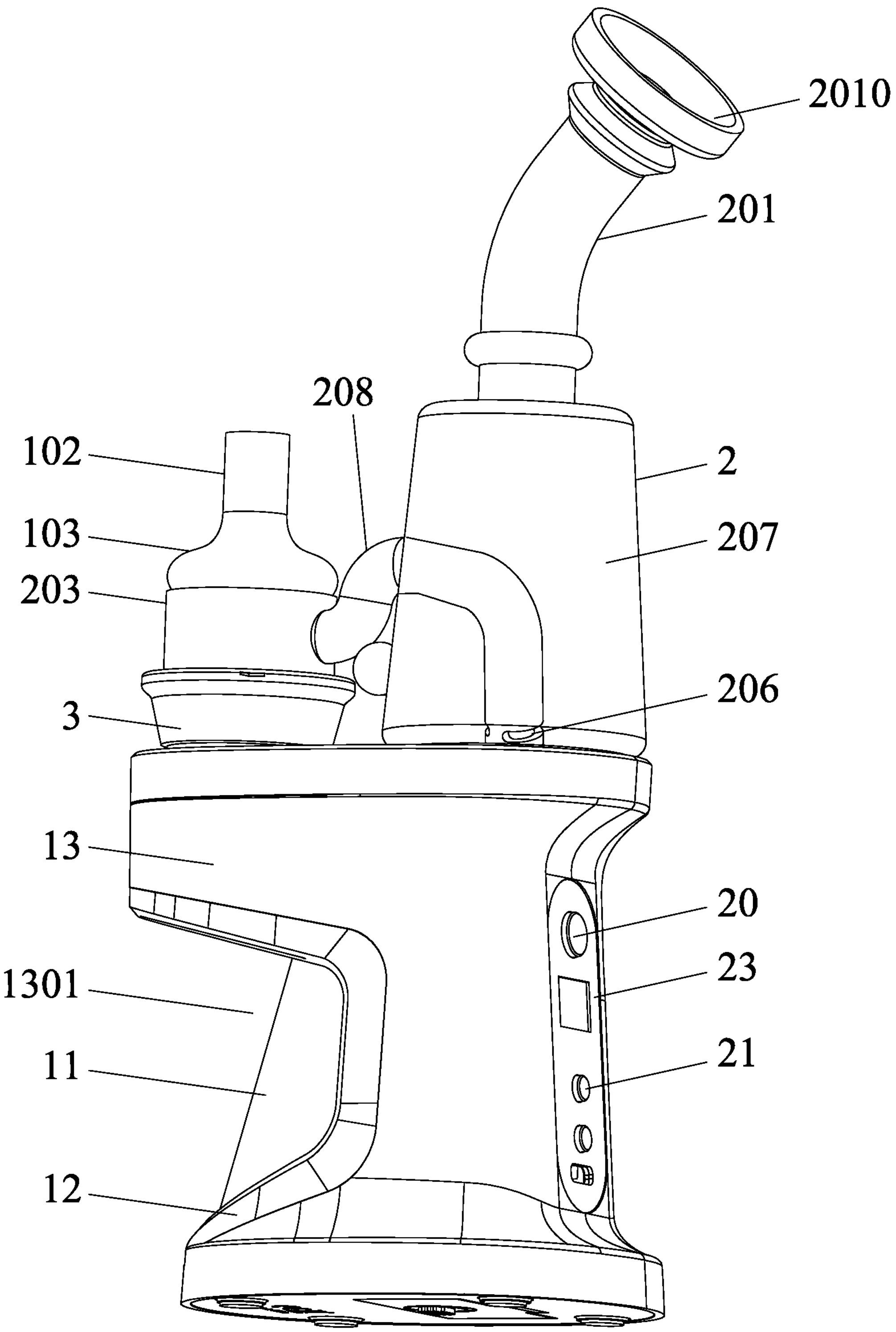
FIG. 4 is a perspective view of a hookah according to one embodiment of the disclosure.
Figure 5:
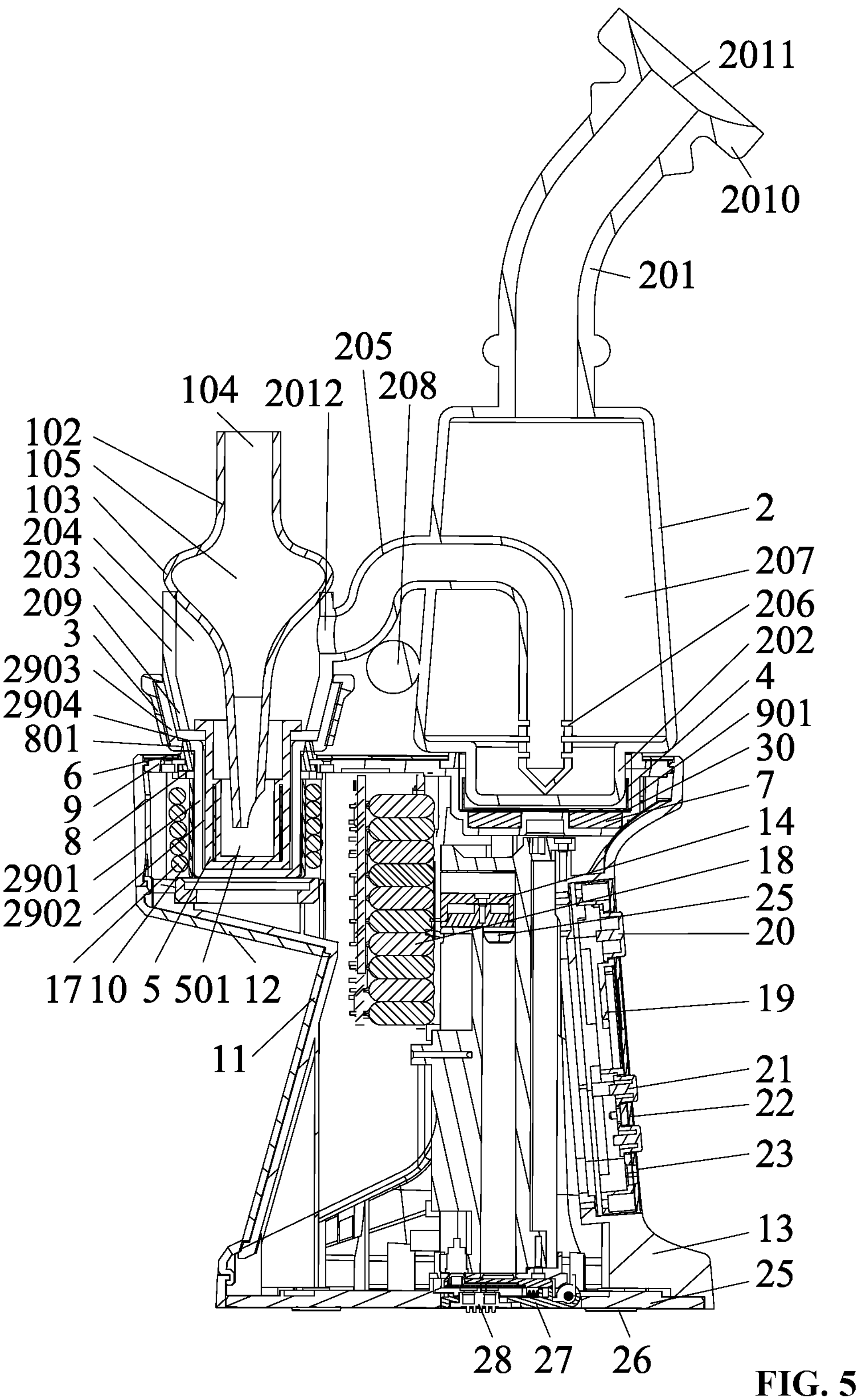
FIG. 5 is a cross-sectional view of a hookah according to one embodiment of the disclosure.
Figure 6:
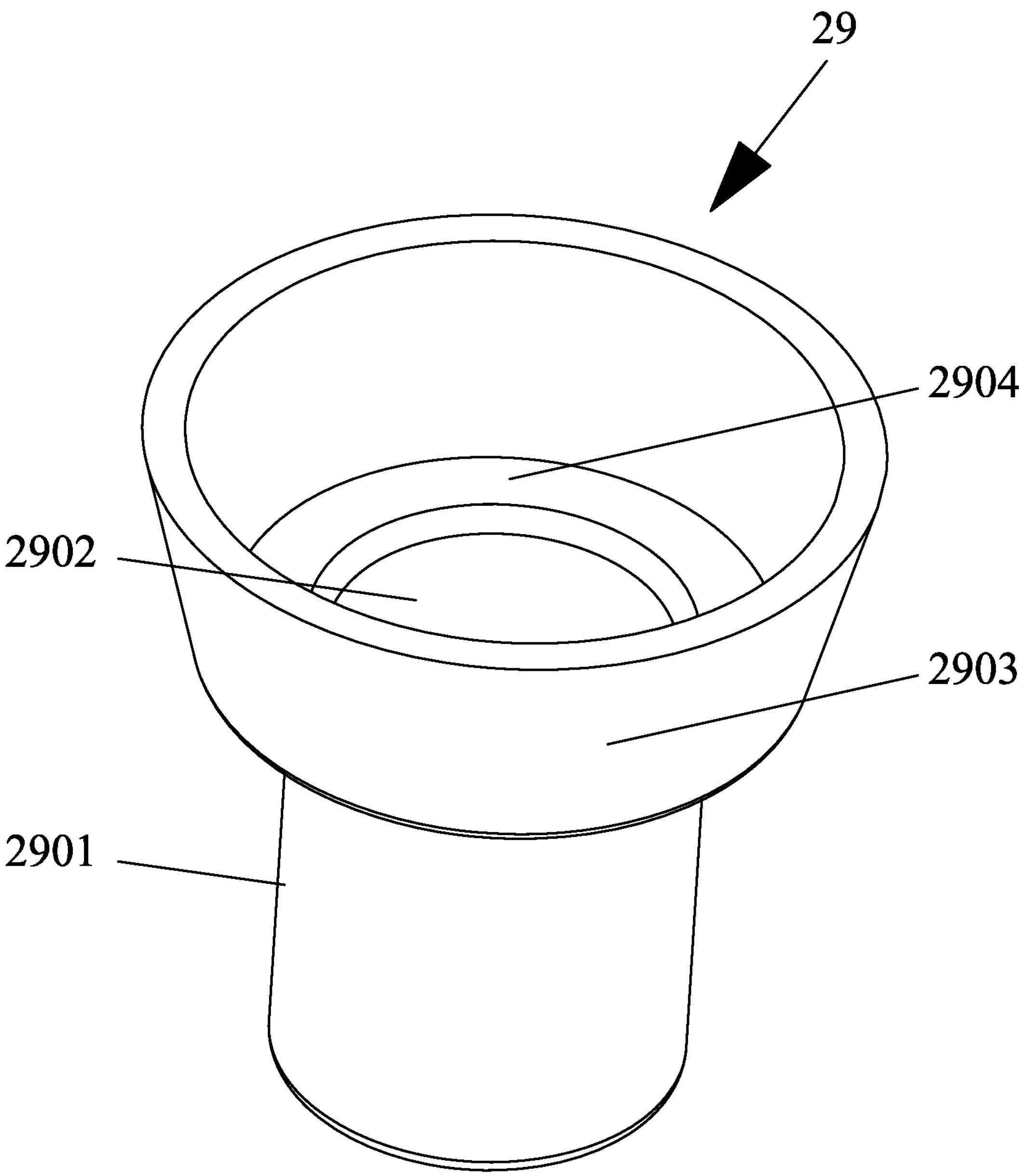
FIG. 6 is a perspective view of a first cup according to one embodiment of the disclosure.
Figure 7:
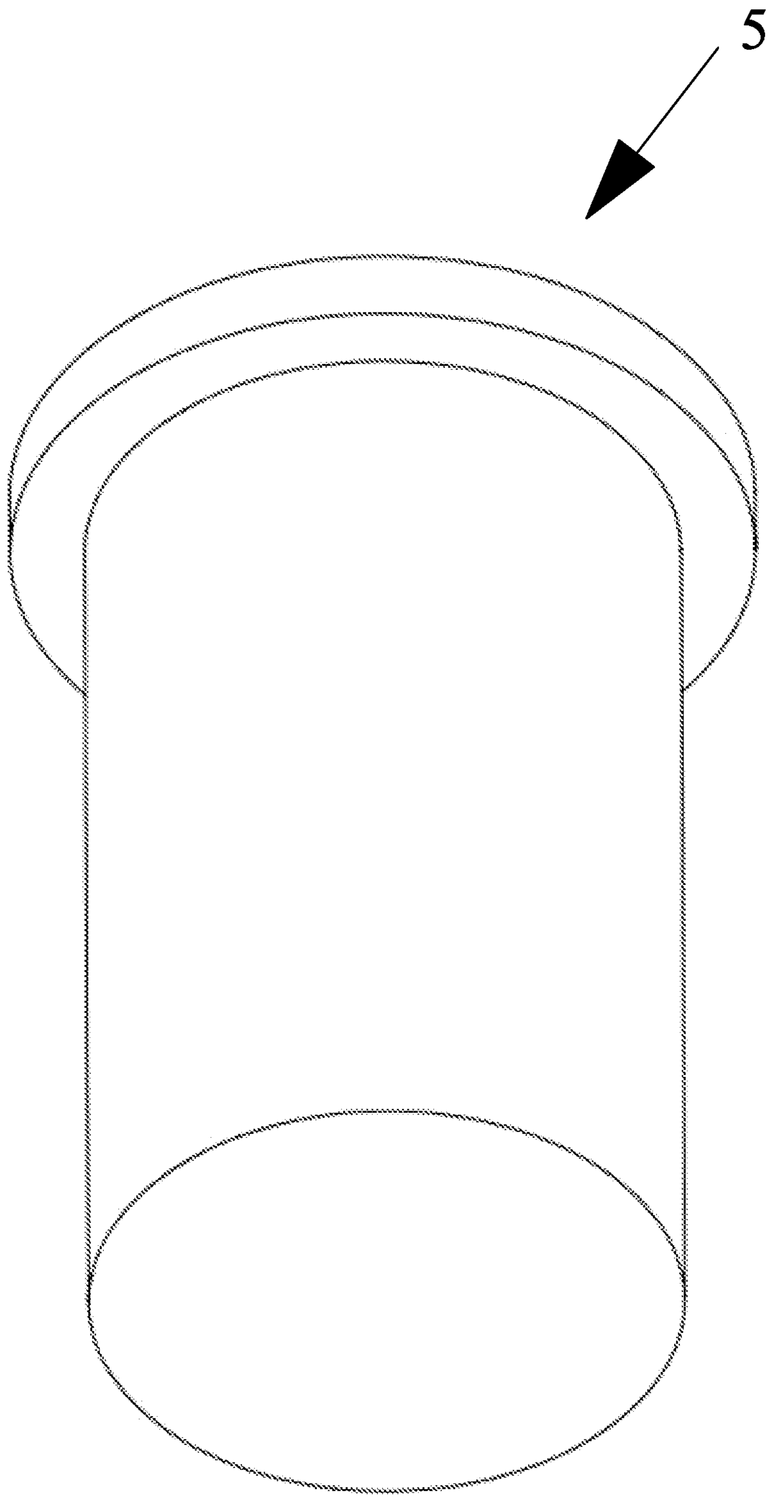
FIG. 7 is a perspective view of a second cup according to one embodiment of the disclosure.
Figure 8:
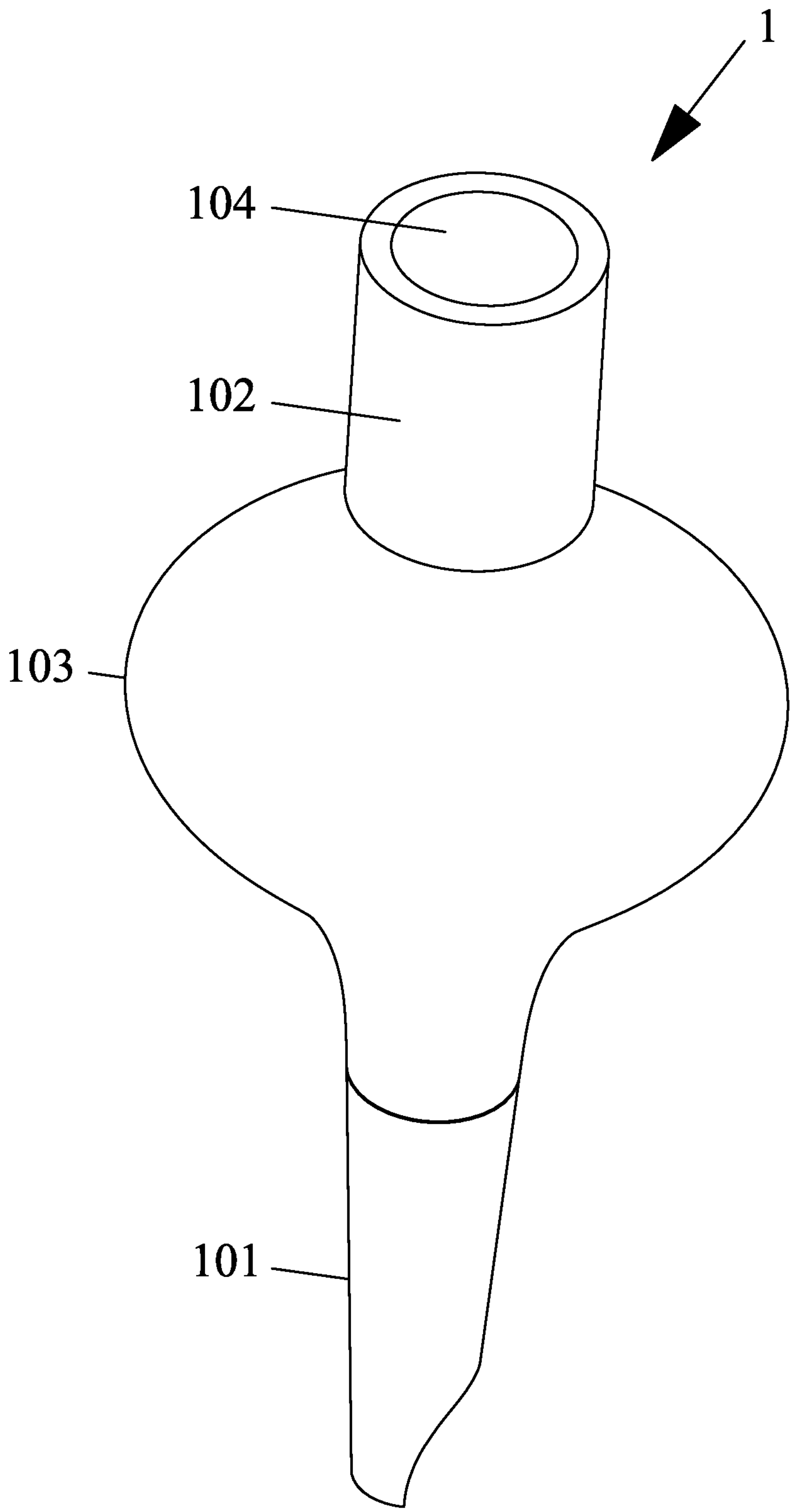
FIG. 8 is a perspective view of an air intake according to one embodiment of the disclosure.

Referring to FIGS. 1-3, a hookah comprises a hookah module, a heater 90, a coil 17, a first cup 29 and/or a second cup 5. The coil 17 is disposed in the heater 90. Tobacco materials are disposed in the first cup 29 and/or the second cup 5. When the heater 90 is energized, the coil produces an electromagnetic field and transfers heat to the tobacco materials in the first cup 29 and/or the second cup 5. The heater comprises a curved wall functioning as a handle 1301.

In an example of the disclosure, the hookah module comprises a water jar 2 for filtering harmful substances from the smoke. In an example of the disclosure, the hookah module further comprises an air intake 1. In an example of the disclosure, the hookah module further comprises the first cup 29 and/or the second cup 5.

In an example of the disclosure, the heater 90 is detachably connected to the water jar 2, the first cup 29, and/or the second cup 5. In an example of the disclosure, the heater 90 is fixedly connected to the first cup 29 and/or the second cup 5.

Referring to FIG. 2, the water jar 2 comprises a jar body 200 comprising a water chamber 207. The jar body 200 comprises a bottom part comprising a first detachable connector. The jar body 200 is fixedly disposed on the heater 90 by the first detachable connector, including but not limited to a screw thread, an interference fit, a buckle, a clamp, a magnet, an adhesive, a pluggable connector, or a combination thereof. After the water is added to the water chamber 207, the smoke is directed through the water for filtering and cooling.

The heater 90 comprises a top part comprising a second detachable connector. The first detachable connector is detachably connected to the second detachable connector so that the jar body 200 is fixedly disposed on the heater 90. The second detachable connector includes, but is not limited to, a screw thread, an interference fit, a buckle, a clamp, a magnet, an adhesive, a pluggable connector, or a combination thereof.

In certain examples, the first detachable connector comprises a convex portion 202 protruding from the bottom part of the jar body 200. The convex portion 202 is formed integrally with the bottom part of the jar body 200. The second detachable connector comprises a first concave portion 901 disposed on the top part of the heater 90 and matched with the convex portion 202 in size. The convex portion 202 is detachably connected to the first concave portion 901.

In certain examples, the first detachable connector comprises a first magnet structure 4 and the second detachable connector comprises at least one second magnet structure 7. The first magnet structure 4 and the at least one second magnet structure 7 are detachably connected by magnetic attraction.

In an alternative preferred example of the disclosure, the first detachable connector comprises the convex portion 202 and the first magnet structure 4 disposed on the convex portion 202. The second detachable connector comprises the first concave portion 901 and the at least one second magnet structure 7 disposed in the first concave portion 901. The convex portion 202 is disposed into the first concave portion 901 so that the first magnet structure 4 and the at least one second magnet structure 7 are detachably connected by magnetic attraction. The at least one second magnet structure 7 is disposed on the bottom or side wall of the first concave portion 901.

One of the first magnet structure 4 and the at least one second magnet structure 7 comprises a first magnet, and the other comprises a second magnet or an iron-containing material for attracting the first magnet.

The water jar 2 is detachably disposed on the heater 90 so as to make it easier for the smoker to hold the heater and inhale the smoke. The smoke flows through the top part of the heater 90 and enters the water jar 2. The heater can operate without having to design an air duct. After passing through the air duct, the smoke is not cooled down, thus affecting the taste of the tobacco smoke.

The jar body 200 comprises a side wall and a pipe 205. The pipe 205 is inserted into the water jar 2 with a first end exposed outside the side wall and a second end close to the bottom part of the jar body 200. The hookah further comprises a smoke collector 203 comprising a smoke chamber 204. The first end of the pipe 205 is connected to the smoke collector 203. The smoke collector 203 comprises a side wall comprising at least one through hole 2012. The pipe 205 communicates with the smoke chamber 204 through the at least one through hole 2012. The second end of the pipe 205 is fixedly close to the bottom part of the jar body 200 so that the water is in full contact with the smoke to achieve a filter and cooling effect. The pipe 205 is disposed outside the heater 90 so that the smoke can be cooled in the pipe 205 before flowing into the water.

Referring to FIGS. 4-8, the first cup 29 comprises a first cavity 2902 communicating with the smoke chamber 204. A first end of the first cup 29 is sealed with a second end open. The smoke collector 203 further comprises a bottom opening communicating with the second end of the first cup 29.

The first cup 29 is detachably connected to the smoke collector 203. The first cup 29 comprises a cup body 2901 comprising the first cavity 2902. A first end of the cup body 2901 is sealed with a second end open. The second end of the cup body 2901 extends radially outward to form a first flange 2904. The first flange 2904 extends axially to form a first side wall 2903 in the shape of a truncated cone with a larger opening towards the cup body. The smoke collector 203 further comprises a second side wall 209 in the shape of a truncated cone with a larger end connected to a lower end of the smoke collector. The first side wall 2903 is matched with the second side wall 209 in size so that the second side wall 209 is nested in the first side wall to prevent leakage of smoke. The lower edge of the second side wall 209 abuts against the first flange 2904. Excess vapor condenses into liquid and flows through the first side wall 2903 into the cup body 2901.

In certain examples, the first cup 29 comprises a side wall comprising an inner surface provided with a metal layer. The metal layer can be any shape including a plane shape, a mesh shape, or other shape. The first cup 29 is configured to hold tobacco materials and heat the tobacco materials through electromagnetic induction. The first cup 29 includes, but is not limited to, a pure metal structure, a glass structure comprising an inner metal layer, a glass structure comprising an outer metal layer, a glass structure comprising a built-in metal, a glaze structure comprising an inner metal layer, a glaze structure comprising an outer metal layer, and a glaze structure comprising a built-in metal.

In certain examples, the second cup 5 is disposed in the first cavity 2902. The second cup 5 comprises a second cavity 501 communicating with the smoke chamber 204. The second cup 5 comprises a side wall comprising an inner surface provided with a metal layer. The metal layer can be any shape including a plane shape, a mesh shape, or other shape. The second cup 5 is configured to hold tobacco materials and heat the tobacco materials through electromagnetic induction. The hookah is even easier to clean because the condensate in the second cup 5 directly flows into the first cup 29 instead of the heater 90. The second cup 5 exceeds the cup body 2901 in height to ensure that the condensate from the second cup 5 can overflow into the first cup 29 with a small amount of condensate remained on the first flange 2904.

A first end of the second cup 5 is sealed with a second end open. The second end of the second cup 5 is disposed into the smoke chamber 204. The second cavity 501 communicates with the first cavity 2902 through the second end of the second cup 5. The second cup 5 is detachably connected to the first cup 29. The second cup 5 includes, but is not limited to, a pure metal structure, a glass structure comprising an inner metal layer, a glass structure comprising an outer metal layer, a glass structure comprising a built-in metal, a glaze structure comprising an inner metal layer, a glaze structure comprising an outer metal layer, and a glaze structure comprising a built-in metal. The second cavity 501 is configured to hold the tobacco materials and the second cup 5 is disposed in the coil 17. The coil 17 can be any shape including a square shape, a triangle shape, a spiral shape, a polygon shape, or other irregular shape.

The jar body 200 further comprises a top portion provide with a hose 201. The hose 201 communicates with the water chamber 207 so as to release the smoke. The hose 201 comprises an open distal end 2011 away from the water chamber 207 and configured for smoke emission. The hose is inclined relative to the jar body 200 so as to makes it easier for the smoker to inhale the smoke.

The open distal end of the hose 201 extends axially to form a bowl-shaped sleeve to support the mouth of a smoker. The bowl-shaped sleeve comprises a third side wall 2010 and a wide opening. A diameter of the bowl-shaped sleeve decreases from the wide opening to the open distal end of the hose. The second end of the pipe 205 comprises at least one air outlet 206. Preferably, the smoke collector 203 further comprises a plurality of through holes 2012. The at least one air outlet 206 and both ends of the pipe 205 facilitate the dispersion of the smoke, thus achieving a filter and cooling effect. Preferably, the plurality of through holes 2012 is disposed at regular intervals on the side wall of the smoke collector.

The water jar 2 further comprises at least one protection pad 208 disposed between the first end of the pipe 205 and the jar body 200. The at least one protection pad 208 is used to reduce the impact force and prevent the damage of the pipe 205.

The smoke collector 203 further comprises an open top. The air intake 1 comprises an intake body 103, a first tube 101 and a second tube 102. The intake body 103 is disposed in the open top and abuts against the side wall of the smoke collector 203 to cover the open top of the smoke collector. The intake body comprises a channel 105 and two openings 104 communicating with the channel. The two openings are disposed on both ends of the intake body. The first tube 101 and the second tube 102 are disposed on both ends of the intake body 103, respectively, to communicate with the two openings 104. The intake body 103 is connected to the first tube 101 and the second tube 102 using integral formation or welding. The air intake 1 is configured to conduct air into the hookah and seal the smoke chamber 204.

Referring to FIG. 3, the top part of the heater 90 is concave to form a second concave portion 1001 defined by a fourth side wall. The coil 17 is wrapped around the fourth side wall. The fourth side wall comprises a heat-resistant material including but not limited to glass, metal, and quartz. In certain examples, the first cup 29 comprises metal and is configured to hold the tobacco materials. The first cup 29 is detachably or fixedly disposed in the second concave portion 1001. In certain examples, the hookah module does not comprise the first cup 29; the second cup 5 comprises metal and is configured to hold the tobacco materials; the second cup 5 is detachably or fixedly disposed in the second concave portion 1001. In an alternative preferred example of the disclosure, the hookah module comprises the first cup 29 and the second cup 5; the second cup 5 is detachably or fixedly disposed in the first cup 29; the second cup 5 comprises metal and is configured to hold the tobacco materials; the first cup 29 is detachably or fixedly disposed in the second concave portion 1001; the metal is heated in a magnetic field produced by the coil 17. The metal includes, but is not limited to, copper, aluminum, silver, gold, tungsten, nickel, and cadmium.

The first cup 29 comprises the cup body 2901 comprising the first cavity 2902. The first end of the cup body 2901 is sealed with the second end open. The second end of the cup body 2901 extends radially outward to form a first flange 2904. The second end of the second cup 5 extends radially outward to form a second flange.

The hookah further comprises at least one elastic support 801 disposed on the top part of the heater 90. The second concave portion 1001 comprises an outlet 902 and the at least one elastic support 801 is disposed around the outlet 902. The elastic support 801 is selected from a spring, an elastic sheet, or a rubber. The rubber includes, but is not limited to, plastic, silica gel, and latex. The first flange 2904 or the second flange abuts against the elastic support 801 so as to reduce heat transfer and impact force, thus facilitating insertion of the first cup 29 and/or the second cup 5 into water jar.

Preferably, referring to FIGS. 1-8, a hookah comprises a water jar 2, a heater 90, an air intake 1, a first cup 29, and a second cup 5.

The water jar 2 comprises a jar body 200, a hose 201, a convex portion 202, a smoke collector 203, a pipe 205, and a first magnet structure 4. The jar body 200 comprises a water chamber 207 configured to hold the water. The convex portion 202 protrudes from the bottom part of the jar body 200 and it can be detachably connected thereto through a buckle connector. The first magnet structure 4 is disposed on the convex portion 202 and it can be detachably connected thereto by magnetic attraction. The pipe 205 is inserted into the water jar 2 with a first end exposed outside the jar body 200. A second end of the pipe 205 is fixedly close to the bottom part of the jar body 200 so that the water is in full contact with the smoke to achieve a filter and cooling effect. The smoke collector 203 comprises a smoke chamber 204 and a side wall. The side wall of the smoke collector 203 comprises at least one through hole 2012 through which the pipe 205 communicates with the smoke chamber 204. The smoke collector 203 further comprises a second side wall 209 in the shape of a truncated cone with a larger end connected to a lower end of the smoke collector. The jar body 200 further comprises a top portion provide with a hose 201. The hose 201 communicates with the water chamber 207 so as to release the smoke. The hose 201 comprises an open distal end 2011 away from the water chamber 207 and configured for smoke emission. The hose is inclined relative to the jar body 200 so as to it easier for the smoker to inhale the smoke. The distal end of the hose 201 extends axially to form bowl-shaped sleeve to support the mouth of a smoker. The bowl-shaped sleeve comprises a third side wall 2010 and a wide opening. The diameter of the bowl-shaped sleeve decreases from the wide opening to the open distal end of the hose. The second end of the pipe 205 comprises at least one air outlet 206. The at least one air outlet 206, the at least one through hole 2012, and both ends of the pipe 205 facilitate the dispersion of the smoke, thus achieving a filter and cooling effect. Preferably, the at least one through holes 2012 is disposed at regular intervals on the side wall of the smoke collector. The water jar 2 further comprises at least one protection pad 208 disposed between the first end of the pipe 205 and the jar body 200. The at least one protection pad 208 is used to reduce the impact force and prevent the damage of the pipe 205. The smoke collector 203 further comprises an open top. The air intake 1 comprises an intake body 103, a first tube 101 and a second tube 102. The intake body 103 is disposed in the open top and abuts against the side wall of the smoke collector 203 so as to cover the open top, thus preventing leakage of the smoke. The intake body comprises a channel 105 and two openings 104 communicating with the channel. The two openings are disposed on both ends of the intake body. The first tube 101 and the second tube 102 are disposed on both ends of the intake body 103, respectively, to communicate with the two openings 104.

The heater 90 comprises a thermal protective sleeve 3, a first cover 6, a second magnet structure 7, a thermal protective ring 8, a second cover 9, a thermal protective cup 10, a holding part 11, a bracket 12, a housing 13, an electrode bracket 14, a first electrode 15, a battery bracket 16, a coil 17, a high frequency power supply 18, charging board 19, a power button 20, a power adjustable button 21, a charging board bracket 22, a mirror 23, a battery 24, a third cover 25, at least four rubber plugs 26, a second electrode 27, a toggle switch 28, a first cup 29, and a protective plate 30. The heater comprises the housing 13, the second cover 9, the holding part 11, the bracket 12, and the third cover 25.

The first electrode 15 is fixedly disposed on the electrode bracket 14. The electrode bracket 14 is disposed on the top part of the battery bracket 16 so as to be in contact with the positive electrode of the battery 24. The battery 24 is fixedly disposed in the battery bracket 16. The battery bracket 16 is fixedly disposed in the housing 13. The coil 17 is fixedly disposed in one side of the top part of the housing 13. The thermal protective cup 10 is disposed in the coil 17 so as to reduce heat transfer and provide thermal insulation for other components. The thermal protective cup 10 comprises a second concave portion 1001 for holding the first cup 29. The high frequency power supply 18 comprises an input terminal and an output terminal. The high frequency power supply 18 is disposed in the housing 13 and the output terminal is fixedly connected to the coil 17 so as to output an alternating current and produce an electromagnetic field. The power button 20 is disposed on the charging board 19 so as to power on a host. The power adjustable button 21 is disposed on the charging board 19 so as to adjust the power output of the host. The charging board 19 is fixedly disposed in the charging board bracket 22. The charging board bracket 22 is disposed in one side of the housing 13. The mirror 23 is fixedly disposed on the outer surface of the charging board bracket 22. The holding part 11 is fixedly disposed on the bracket 12. The bracket 12 is fixedly disposed on one side of the housing 13. The second electrode 27 is fixedly disposed in the third cover so as to be in contact with the negative electrode of the battery 24. The toggle switch 28 is disposed on the second electrode 27 to move the second electrode 27 so that the battery 24 can be removed or installed. The third cover 25 is fixedly disposed in the bottom part of the housing 13. The second electrode 27 is disposed under the battery bracket 16 so as to be in contact with the negative electrode of the battery 24. The at least four rubber plugs 26 are fixedly disposed at four corners of the bottom surface of the third cover 25. The second cover 9 is fixedly disposed on the top part of the housing 13. The second cover 9 comprises a first end, a second end, and an outlet 902. The outlet 902 is disposed on the first end of the second cover 9 so as to correspond with the second concave portion 1001. The thermal protective ring 8 is disposed on the outlet 902 so as to reduce heat transfer. The thermal protective ring 8 comprises a first surface provided with at least one elastic support 801. The second end of the second cover 9 is concave to form a first concave portion 901. The second magnet structure 7 is disposed in the first concave portion 901. The protective plate 30 is disposed on the bottom wall of the second cover 9 so as to prevent the second magnet structure 7 from falling out. The first cover 6 is matched with the first surface of the second cover 9 in shape and size so as to be fixedly disposed on the second cover 9. The first cup 29 comprises a cup body 2901 comprising a first cavity 2902. The cup body 2901 is detachably disposed through the outlet 902 into the second concave portion 1001. A first end of the cup body 2901 is sealed with a second end open. The second end of the cup body 2901 extends radially outward to form a first flange 2904. The first flange 2904 extends axially to form a first side wall 2903 in the shape of a truncated cone with a larger opening towards the cup body. The thermal protective sleeve 3 is disposed around the first side wall 2903 so as to keep the heat in the second cup 5 and the first side wall 2903, thus preventing the smoker from touching hot components of the hookah. The first flange 2904 is disposed on the at least one elastic support 801. The second cup 5 is detachably disposed in the first cavity 902.

The second cup 5 comprises a second cavity 501 and a side wall. The side wall of the second cup 5 comprises an inner surface provided with a metal layer. The metal layer is configured to heat the tobacco materials in the second cavity 501. The jar body 200 is disposed on the heater 90. The first magnet structure 4 is disposed around the convex portion 202. The at least one second magnet structure 7 is attracted to the first magnet structure 4 to ensure that the convex portion 202 is disposed into the first concave portion 901. The second side wall 209 is nested in the first side wall surrounded by the first side wall 2903 to ensure that the smoke generated from the tobacco materials can be forced from the second cavity 501 into the smoke chamber 204.

Figure 9:
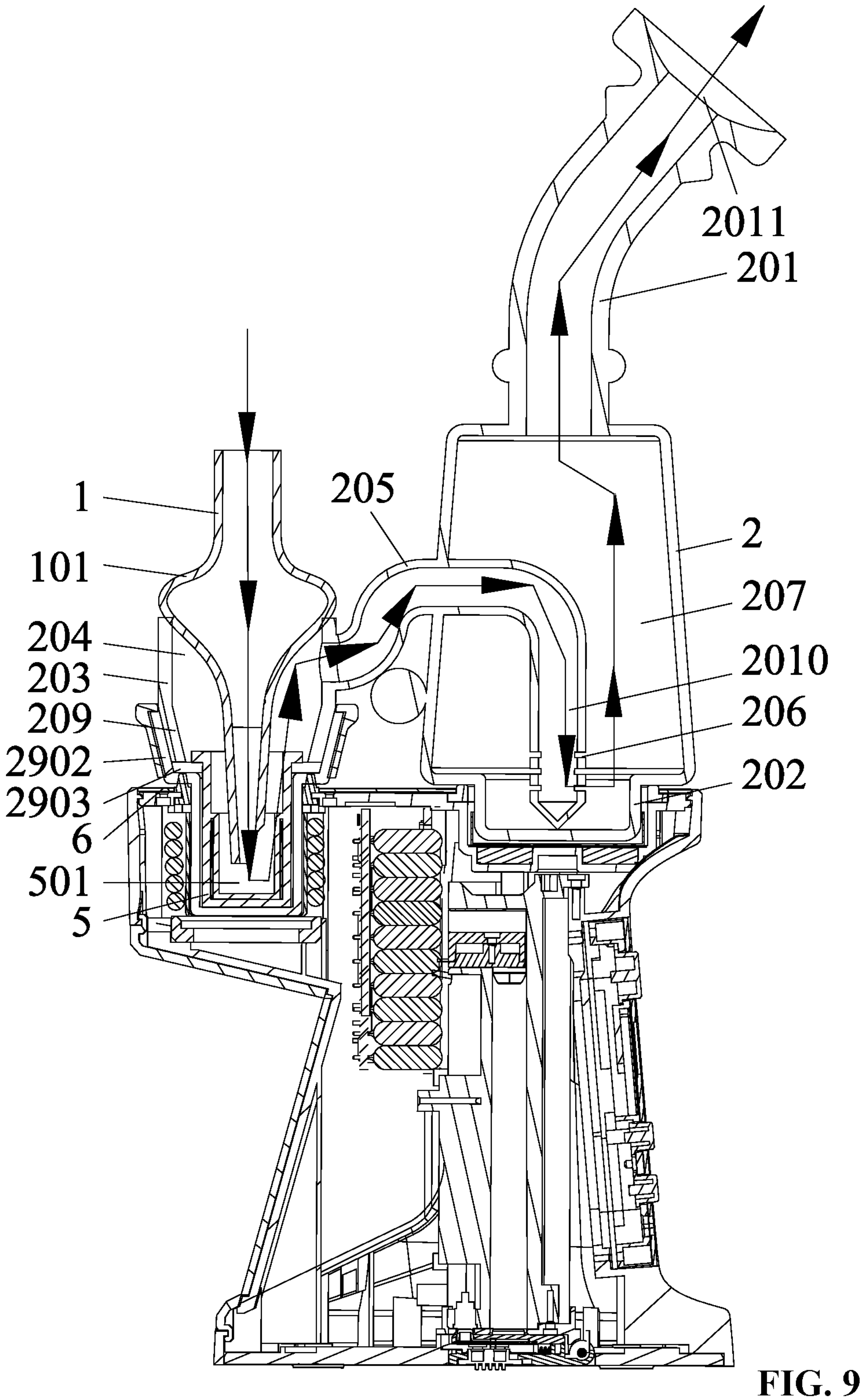
FIG. 9 is a cross-sectional view including arrows showing the direction of the air flow in a hookah according to one embodiment of the disclosure.

FIG. 9 is a cross-sectional view including arrows showing the direction of the air flow in the hookah of the disclosure. When the smoker smokes the tobacco materials, external air flows through the two openings 104, causing the second cup 5 to heat the tobacco materials. The smoke is produced and flows through the smoke chamber 204, the pipe 205, and the at least one air outlet 206, successively, and is discharged into the water chamber 207 for filtering harmful substances. Then the smoke flows through the mouthpiece 2011 and is inhaled by the smoker.

It will be obvious to those skilled in the art that changes and modifications may be made, and therefore, the aim in the appended claims is to cover all such changes and modifications.

The invention claimed is:

1. A hookah comprising a heater, at least one elastic support, a first cup, and a second cup, wherein:

the heater comprises a coil, a top part, and a second detachable connector disposed on the top part;

the top part of the heater is concave to form a second concave portion, and the coil is wrapped around a side wall of the second concave portion;

the at least one elastic support is disposed on the top part of the heater;

the second concave portion comprises an outlet and the at least one elastic support is disposed around the outlet;

the first cup is disposed in the second concave portion, and comprises a first cavity:

the second cup comprises a second cavity;

the second cup is disposed in the first cavity so that the first cavity communicates with the second cavity;

the second cup comprises a side wall comprising an inner surface provided with a metal layer;

the first cup is detachably connected to the second concave portion; and the second cup is detachably connected to the first cup; and the first cup comprises a cup body comprising the first cavity; the cup body comprises a first end and a second end; the first end is closed and the second end is open; the second end of the cup body extends radially outward to form a first flange; and the first flange is disposed on the at least one elastic support.

2. The hookah of claim 1, wherein the second detachable connector comprises a first concave portion and a magnet structure disposed on the top part of the heater; the magnet structure is disposed in the first concave portion; and the heater comprises a curved wall functioning as a handle.

3. The hookah of claim 1, wherein the hookah further comprises a water jar detachably disposed on the top part of the heater; the water jar comprises a jar body provided with a water chamber configured to hold water; the jar body comprises a bottom part provided with a first detachable connector; and the first detachable connector is detachably connected to the second detachable connector.

4. The hookah of claim 3, wherein the water jar further comprises a side wall and a pipe disposed in the jar body; the pipe comprises a first end and a second end; the pipe is disposed into the water jar with the first end exposed outside the side wall and the second end close to the bottom part of the jar body; the hookah further comprises a smoke collector comprising a water chamber; the first end of the pipe is connected to the smoke collector; the smoke collector comprises a side wall comprising at least one through hole; the pipe communicates with the smoke chamber through the at least one through hole; the first cup comprises a first end and a second end; the first end is closed and the second end is open; the smoke collector further comprises a bottom opening communicating with the second end of the first cup;

the first flange extends axially to form a first side wall in the shape of a truncated cone with a larger opening towards the cup body; the smoke collector further comprises a second side wall in the shape of a truncated cone with a larger end connected to a lower end of the smoke collector; the first side wall is matched with the second side wall in size so that the second side wall is nested in the first side wall; and a lower edge of the second side wall abuts against the first flange;

the jar body further comprises a top portion provide with a hose communicating with the water chamber; the hose comprises an open distal end away from the water chamber and configured for smoke emission; and the hose is inclined relative to the jar body;

the open distal end of the hose extends axially to form a bowl-shaped sleeve to support the mouth of a smoker; the bowl-shaped sleeve comprises a third side wall and a wide opening; and a diameter of the bowl-shaped sleeve decreases from the wide opening to the open distal end of the hose;

the second end of the pipe comprises at least one air outlet;

the water jar further comprises at least one protection pad disposed between the first end of the pipe and the jar body; and the smoke collector further comprises an open top; the hookah further comprises an air intake disposed in the open top; the air intake comprises an intake body, a first tube, and a second tube; the intake body is disposed in the open top and abuts against the side wall of the smoke collector; the intake body comprises a channel and two openings communicating with the channel; the two openings are disposed on both ends of the intake body; the first tube and the second tube are disposed on both ends of the intake body, respectively, to communicate with the two openings.

* * * * *